(12) United States Patent
Biber et al.

(10) Patent No.: US 10,551,844 B2
(45) Date of Patent: Feb. 4, 2020

(54) METHOD FOR MAPPING A PROCESSING AREA FOR AUTONOMOUS ROBOT VEHICLES

(71) Applicant: Robert Bosch GmbH, Stuttgart (DE)

(72) Inventors: Peter Biber, Poltringen (DE); Hannes Becker, Tuebingen (DE); Stefan Hensel, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 15/536,842

(22) PCT Filed: Nov. 18, 2015

(86) PCT No.: PCT/EP2015/076942
§ 371 (c)(1),
(2) Date: Jun. 16, 2017

(87) PCT Pub. No.: WO2016/096304
PCT Pub. Date: Jun. 23, 2016

(65) Prior Publication Data
US 2018/0004217 A1    Jan. 4, 2018

(30) Foreign Application Priority Data
Dec. 16, 2014  (DE) .................. 10 2014 226 084

(51) Int. Cl.
*G05D 1/02*   (2006.01)
(52) U.S. Cl.
CPC ......... *G05D 1/0221* (2013.01); *G05D 1/0274* (2013.01); *G05D 2201/0208* (2013.01); *G05D 2201/0215* (2013.01)
(58) Field of Classification Search
CPC ............... G05D 1/0221; G05D 1/0274; G05D 2201/0208; G05D 2201/0215
See application file for complete search history.

(56) References Cited

U.S. PATENT DOCUMENTS

| | | | |
|---|---|---|---|
| 2005/0085947 A1* | 4/2005 | Aldred ................. | G05D 1/0242 700/253 |
| 2011/0077774 A1* | 3/2011 | Choi ....................... | A47L 9/009 700/253 |

(Continued)

FOREIGN PATENT DOCUMENTS

| DE | 10 2013 212 605 A1 | 12/2014 |
|---|---|---|
| WO | 2008/136570 A1 | 11/2008 |
| WO | 2014/003517 A1 | 1/2014 |

OTHER PUBLICATIONS

International Search Report corresponding to PCT Application No. PCT/EP2015/076942, dated Jun. 6, 2016 (German and English language document) (5 pages).

*Primary Examiner* — Courtney D Heinle
(74) *Attorney, Agent, or Firm* — Maginot, Moore & Beck LLP

(57) ABSTRACT

The disclosure relates to a method for mapping a processing area, in particular for determining a processing area, as part of a navigation method for autonomous robot vehicles. According to the disclosure, said method is characterized in that boundary lines between adjoining mapped and unmapped subareas of the processing area that is to be mapped are identified by comparing distances traveled by the robot vehicle during an initial mapping trip within the processing area, mapping of an unmapped subarea adjoining a boundary line is initiated from a point on one of those identified boundary lines during another mapping trip of the robot vehicle into the unmapped subarea, and a map of the processing area is created on the basis of the subareas mapped by the robot vehicle.

19 Claims, 6 Drawing Sheets

(56) References Cited

U.S. PATENT DOCUMENTS

2014/0222279 A1* 8/2014 Stout .................. G05D 1/0219
 701/25
2014/0324246 A1* 10/2014 Biber .................. G05D 1/0219
 700/302

* cited by examiner

METHOD FOR MAPPING A PROCESSING AREA FOR AUTONOMOUS ROBOT VEHICLES

This application is a 35 U.S.C. § 371 National Stage Application of PCT/EP2015/076942, filed on Nov. 18, 2015, which claims the benefit of priority to Serial No. DE 10 2014 226 084.1, filed on Dec. 16, 2014 in Germany, the disclosures of which are incorporated herein by reference in their entirety.

BACKGROUND

The disclosure relates to a method for mapping a processing area, in particular for determining a processing area, as part of a navigation method for autonomous robot vehicles. The disclosure also relates to such a robot vehicle.

DE 102013212605 A1 discloses a method for working region acquisition of at least one working region of an autonomous service robot by means of at least one recording unit and one generating unit. In this method, in a first method step, a visual media file of the at least one working region is recorded by the at least one recording unit before working operation of the autonomous service robot and, in a second method step, a map of the at least one working region is generated by the generating unit from the at least one visual media file.

SUMMARY

According to the disclosure, a method for mapping a processing area, in particular for determining a processing area as part of a navigation method for autonomous mobile robot vehicles, is proposed. The method provides that boundary lines between adjoining mapped and unmapped subareas of the processing area to be mapped are identified by comparing distances covered by the robot vehicle traveling over the processing area on an initial mapping trip, mapping of an unmapped subarea adjoining a boundary line is initiated from a point on such an identified boundary line in the course of a further mapping trip of the robot vehicle into the unmapped subarea, and a map of the processing area is created on the basis of the subareas mapped by the robot vehicle.

An "autonomous robot vehicle" is intended to be understood as meaning in particular an at least partially automatic mobile device that performs a job of work, preferably processing of an area (the processing area), at least partially automatically. In particular, the autonomous robot vehicle is intended to begin a job automatically, end it automatically and/or select and/or influence at least one parameter concerning the processing of the processing area automatically. In addition, a device that moves automatically, at least for performing this work, in particular for processing the processing area, and/or advantageously advances autonomously in a specified working area, the processing area, is intended to be understood in particular. Typical application areas of such robot vehicles comprise various activities, such as for example sweeping, vacuuming, cleaning, lawn mowing, collecting (gathering), sorting, watering, fertilizing, mapping or the like. Therefore, relevant principles and technical teachings of the exemplary embodiments presented hereinafter to illustrate the advantages of the disclosure may of course be applied to any desired autonomous robot vehicles, for example in particular autonomous sweeping machines, autonomous cleaning robots, autonomous snow clearing robots, autonomous vacuum cleaners, autonomous swimming pool cleaning machines, autonomous floor wiping robots, autonomous lawnmowers, autonomous seed drills, autonomous watering robots, autonomous fertilizing machines, autonomous mapping machines and the like.

The "processing area" refers in particular to an area to be processed by the autonomous robot vehicle and to be mapped in the course of the mapping method according to the disclosure. The processing area is advantageously defined by a delimitation.

"Mapping of a processing area", "determination of a processing area" and "creation of a map" are intended to be understood as meaning in particular a process in which items of information, in particular parameters, are acquired location-dependently, in particular space-relatedly, preferably in relation to the processing area of the autonomous robot vehicle. The information may be items of information on objects and/or matters that are or may be necessary, relevant and/or appropriate in the course of the navigation method. Various examples of such items of information are conceivable, in particular for example in the course of mapping soil conditions, occurrence of vegetation, occurrence of an obstacle and/or object, distribution of properties, occurrence of chemicals or some other matter that appears appropriate to a person skilled in the art, in particular a soil-scientific, geological and/or engineering matter with respect to the processing area. "Mapping/determination of a processing area" is preferably intended to be understood as meaning a process in which a processing area is at least partially determined, particularly preferably a delimitation of the processing area is detected and determined. In particular, mapping with respect to the occurrence of obstacles and/or boundaries of the processing area may be used to create a map of the processing area that can in principle be processed.

In relation to an autonomous lawnmower, mapping of a processing area may be related in particular for example to the following items of information: occurrence of lawns—consequently preferably also the boundary of a lawn, height of grass, moisture on the grass, occurrence of stones, occurrence of obstacles, slope/gradient of the land, mowed/unmowed state of the lawn or the like. Preferably, mapping the occurrence of a lawn may be used in combination with occurrence of an obstacle to create a map of the processing area that can in principle be processed, in particular an area of lawn.

The location-dependent items of information successively acquired in the course of the method are advantageously collected, in particular collected successively, in the form of a list, a table, a collage, a matrix, in particular a multidimensional matrix, preferably a map, particularly preferably a multidimensional and/or pseudo-multidimensional map, an outline, a floor plan, a land plan, a topographical map, a land survey or in a similar way that appears appropriate to a person skilled in the art. In this case, results of the mapping, in particular the location-dependent items of information in relation to the processing area, are compiled in the map, in particular digitally, preferably stored, particularly preferably as a basis and/or as part of a navigation method, and made available to the autonomous robot vehicle. Without restricting the generality, the term "map" is used hereinafter as representative of the alternatives mentioned (list, table, matrix, . . . ).

"Navigation method" is intended to be understood as meaning a method that serves at least for the navigation, preferably the changing of location, in particular the kinematic movement, of the autonomous robot vehicle and makes possible inter alia an autonomous mobile movement of the robot vehicle. In one embodiment, the navigation method may in particular also be realized as a method independent of the mapping. The navigation method advantageously checks, coordinates and controls tasks concerning path planning, movement control and positional determination of the autonomous robot vehicle. Preferably carried out in the course of the navigation method are tasks such as for example calculation of a movement plan, calculation of a direction of travel, calculation of a distance to be covered, initiation of a movement, open-loop and/or closed-loop control of a movement, in particular on the basis of a movement plan, reaction to obstacles on the processing area and/or reaction to delimitations of the processing area, determining the current position, in particular measuring of position and/or odometry data, adjusting the position with a control device controlling the processing of the processing area, activation of processing areas, ending a movement and the like.

In the method according to the disclosure, the autonomous mobile robot vehicle begins mapping of the processing area to be mapped on an initial mapping trip, during which the robot vehicle successively travels over and maps the processing area. The initial mapping trip may preferably be started from any desired point on the processing area, and particularly preferably in a random direction. During this initial mapping trip, the autonomous robot vehicle travels over the processing area to be mapped of its own accord, in particular autonomously. At least the autonomous robot vehicle is designed to determine a distance covered (alternatively and/or additionally associated physical parameters such as speed, time) and to detect an obstacle on a path and/or a delimitation, in particular a border, of the processing area. The autonomous robot vehicle has at least one device provided for this, preferably at least one sensor device for the detection of obstacles and delimitations of the processing area or the like, and also at least one device for ascertaining position and/or odometry data of the autonomous delimiting vehicle, in particular position and/or odometry data in relation to the processing area traveled over. By way of example, the latter device may be realized in the form of a traction control system, which ascertains from a revolution of drive wheels of the autonomous robot vehicle a distance covered and a heading angle covered. Furthermore, further sensor devices for the detection and/or determination of further map-relevant items of information may also be provided.

"Provided" is intended to be understood as meaning in particular specifically "programmed", "designed" and/or "equipped". That an object is "provided" for a specific function is intended to be understood as meaning in particular that the object performs and/or carries out this specific function in at least one application state and/or operating state or is designed for performing the function.

If the autonomous mobile robot vehicle encounters an obstacle and/or a delimitation of the processing area during its initial mapping trip, wherever possible the initial mapping trip is continued after a defined change of direction of the robot vehicle within the processing area to be mapped. In this case, the autonomous mobile robot vehicle preferably covers on its initial mapping trip paths that substantially follow one another in the form of a defined pattern. "Substantially" means here in particular that short paths, as are covered for example in the course of turns and/or changes of direction, are not taken into account in this consideration. This pattern of paths following one another consists particularly preferably of parallel paths with 180° turns at their ends. Alternatively, other patterns are also conceivable, for example in the form of semicircles of increasing or decreasing radius, in the form of triangles of increasing or decreasing area, in a spiral form or in some other form that appears appropriate to a person skilled in the art. In principle, the method according to the disclosure can be carried out even with unordered patterns, for example random patterns, on the basis of which the autonomous mobile robot vehicle travels over the processing area to be mapped. A comparison of distances covered on paths traveled can take place from any desired pattern by using correspondingly complex algorithms, to be carried out by an evaluation unit. In this case, however, the effort for calculating these distances covered and the comparison that can be derived therefrom increases with increasing complexity of the pattern. Therefore, a pattern of in particular parallel paths, preferably paths lying next to one another, with 180° turns at their ends represents a particularly simple pattern, and in particular requires particularly little effort for the comparison of the distances covered on these paths. In a particularly preferred embodiment of the method according to the disclosure, the parallel paths, preferably the paths lying next to one another, are traveled over by the robot vehicle one after the other. Alternatively, paths lying next to one another may however also not be traveled over one after the other, but in any desired sequences, in particular periodic sequences. For example, it is conceivable that, after the first traveled path, an autonomous robot vehicle initially travels over a further path that in the resultant pattern of paths results as a fourth neighboring path.

If further travel of the autonomous mobile robot vehicle is not possible after a turn or the turn itself is not possible, the initial mapping trip is ended.

By comparison of distances covered by the robot vehicle traveling over the processing area on the initial mapping trip, boundary lines between adjoining mapped and unmapped subareas are identified in the course of the method for mapping the processing area. "Subareas" in this case represent respectively contiguous pieces of the overall processing area to be mapped, an unmapped subarea differing from a mapped subarea to the extent that the autonomous mobile robot vehicle has not yet traveled over the unmapped subarea, and consequently has also not yet mapped it in the sense of the method according to the disclosure.

A "boundary line" is intended to be understood as meaning in particular a virtual line that is preferably at least temporarily compiled together with the items of information acquired in the course of the mapping of the processing area, preferably stored, particularly preferably as a basis and/or as part of the navigation method, and made available to the autonomous robot vehicle. Particularly preferably, for this parameters determining a boundary line, for example in particular a starting point and an end point and/or a starting point, direction and length of the boundary line, may be determined in relation to the processing area and processed. Furthermore, the position of the unmapped region may also be taken into account with respect to the parameters determining the boundary line (for example "left/right of the boundary line"). One or more boundary lines advantageously serve in the mapping method according to the disclosure for marking subareas still unmapped on the initial mapping trip in delimitation from already mapped subareas. In particular, such a boundary line may for example be defined as a part, in particular as a portion, of a path traveled. In the further course of the method, preferably after ending of the initial mapping trip, a point on such an identified boundary line is traveled to in order to initiate mapping of the unmapped subarea adjoining this boundary line in the course of a further mapping trip. In particular, the position of this point on an identified boundary line may be calculated and/or determined from the parameters determining the position of the associated boundary line. If no boundary line was identified during the initial mapping trip, no further mapping trip is necessary to map the overall processing area over the full surface area. The point identifies in particular the location on a boundary line from which mapping of the unmapped subarea adjoining the boundary line is initiated, preferably begun, in the course of a further mapping trip.

According to the disclosure, the mapping of the processing area is performed successively on the basis of the subareas mapped, in particular traveled over, by the robot vehicle. A map of the processing area may subsequently be created once or likewise successively on the basis of the subareas mapped by the robot vehicle. "Successively created" may be understood as meaning in particular that already existing items of information are supplemented and/or modified and/or overwritten and/or newly created. Preferably, items of information obtained by a further mapping trip are added to the items of information collected on an initial mapping trip and also previous further mapping trips.

The method according to the disclosure advantageously allows simple and specific mapping of a processing area, in particular determination of a processing area as part of a navigation method, to be realized for autonomous mobile robot vehicles. Particularly advantageously, mapping of the processing area can be carried out without any prior knowledge of details specifying the processing area, in particular details with respect to any presence of obstacles and/or delimitations and/or outlines of the processing area. The autonomous robot vehicle travels over and maps the processing area at least partially in the course of the initial mapping trip, so that at least a mapped subarea results. By comparison of distances covered by the autonomous robot vehicle, boundary lines between adjoining mapped and unmapped subareas of the processing area to be mapped are thereby identified—in particular during the initial mapping trip, but likewise also if appropriate after the initial mapping trip in the course of further mapping trips. After ending of the initial mapping trip, mapping of the unmapped subarea adjoining the respective boundary line is subsequently initiated in the course of each further mapping trip, starting in each case from a point on an identified boundary line. In principle, the method steps can be repeated iteratively up until the ending of the method.

The map of the processing area is created either successively or after the mapping trips on the basis of the subareas mapped by the robot vehicle. Preferably, this map contains all of the collected items of information concerning the mapped subareas, both of the initial mapping trip and of every further mapping trip. Subareas that cannot/could not be mapped either in an initial mapping trip or in any further mapping trip of the autonomous robot vehicle are identified in the map as an obstacle or unmappable subareas. Consequently, the resultant map of the mapping method according to the disclosure of a processing area has particularly advantageously a (theoretically) complete coverage of the processing area, revealing mapped processing areas and obstacles (unmappable subareas). In particular, the coverage of the map in relation to the actual (physically achievable) processing area is more than 80%, advantageously more than 90%, particularly advantageously more than 95%.

In comparison with autonomous mobile robot vehicles of the prior art, which travel over a processing area stochastically, the method according to the disclosure allows mapping of the processing area in a systematic way, and consequently cost-effectively, particularly advantageously in a much shorter time and covering a shorter overall distance. In particular, as a consequence of mapping in a systematic way, a saving of energy can be realized by avoiding traveling repeatedly over paths and/or areas, so that, with a limited energy supply, the autonomous robot vehicle can map a comparatively larger processing area than an autonomous robot vehicle of the prior art.

In a preferred embodiment of the method according to the disclosure for mapping a processing area, the initial mapping trip and the further mapping trip and/or further mapping trips are connected by way of a transfer trip of the robot vehicle.

In this way, a particularly simple and quick journey of the robot vehicle to the point on the boundary line, and consequently quick mapping of the unmapped subarea adjoining the boundary line, can take place. During the transfer trip, a further mapping may take place or, in an alternative embodiment, the mapping may be interrupted during the transfer trip. The navigating method of the autonomous robot vehicle is advantageously designed to plan and carry out a short and preferably obstacle-free transfer trip to the point, in particular calculated point, on the boundary line by means of the already collected items of information with respect to the position of the boundary line and also with respect to obstacles and/or delimitations that are possibly present. This allows the time and energy of the robot vehicle that is required for carrying out the mapping method to be reduced particularly advantageously.

In a preferred embodiment of the method according to the disclosure for mapping a processing area, a boundary line between adjoining mapped and unmapped subareas is identified if distances covered by the robot vehicle on paths lying next to one another, in particular paths following one another, differ from one another by a relative and/or absolute amount.

By comparison of distances covered by the robot vehicle on paths lying next to one another, in particular paths following one another, an obstacle on the processing area, advantageously an obstacle on one of the paths, particularly advantageously an obstacle on the shorter of the paths, can advantageously be detected in an easy, reliable and particularly cost-effective way: if the path lengths of paths lying next to one another differ from one another by a relative and/or absolute amount, this implies that the robot vehicle was only able to cover a shortened distance on account of an obstacle on the shorter of the paths. In particular, specifications for the relative and/or absolute amount by which distances of two paths must differ to establish a difference can be defined. It is consequently advantageously possible to eliminate inaccuracy of the distance determination as a cause of false obstacle detection.

The specifications for the relative and/or absolute amount by which distances of two paths must differ to establish a difference depend in particular on the embodiment of the autonomous robot vehicle, for example on a length and/or width of the robot vehicle, on the position and/or odometry device used and the accompanying accuracy in the positional determination and the like. In an embodiment of the method according to the disclosure given by way of example, in particular in relation to an autonomous lawnmower, a relative amount may lie in particular at 10%, advantageously at 5%, particularly advantageously at 1%, and an absolute amount in particular at 200 cm, advantageously at 100 cm, particularly advantageously at 50 cm. In the case of an autonomous robot vehicle that moves on relatively level floors, for example of an interior space, a positional determination can be carried out much more accurately, so that here likewise considerably lower specifications can be defined for the relative and/or absolute amount by which distances of two paths must differ to establish a difference. In such an exemplary embodiment, a relative amount could lie in particular at 1%, advantageously at 0.5%, particularly advantageously at 0.1%, and an absolute amount could lie in particular at 50 cm, advantageously at 25 cm, particularly advantageously at 10 cm.

In a preferred embodiment of the method according to the disclosure for mapping a processing area, an identified boundary line is assigned to the longer of two paths lying next to one another, in particular paths following one another.

In this way, a localization of the boundary line can be performed by means of assignment of an identified boundary line to a longer of two paths lying next to one another, in particular paths following one another. Preferably, parameters determining a boundary line, for example in particular a starting point and an end point and/or a starting point, direction and length of the path to which the boundary line is assigned, are in this case evaluated in relation to the processing area and/or processed, in particular stored and/or made available to the device.

In a preferred embodiment of the method according to the disclosure for mapping a processing area, an identified boundary line represents the part of a longer path, in particular parallel path, that extends beyond the compared distance of the shorter path.

In this way it can be achieved that an unmapped subarea—in particular a mappable subarea perhaps located behind the obstacle—is identified by means of a boundary line on a side facing away from the obstacle. In particular, the unmapped subarea is thereby identified at such a location of a longer path passing laterally past the obstacle at which entry into the unmapped subarea adjoining the boundary line, in particular a mappable subarea, may be possible without being hindered by the obstacle. "Mappable" means here able to be reached by the autonomous mobile robot vehicle without any obstacle, traveled over and consequently measured.

In an advantageous embodiment of the method according to the disclosure for mapping a processing area, the robot vehicle travels over the processing area to be mapped during a mapping trip in a defined pattern, preferably in substantially parallel paths with turns at their ends, in particular paths lying next to one another with 180° turns at their ends.

"Parallel paths" is intended to be understood as meaning in particular that the paths run parallel to one another in relation to the entire length, though fluctuations are possible, possibly owing to the structure of the processing area and/or the accuracy with which the robot vehicle can travel over a path in one direction. "Substantially" indicates that the paths may in practice have slight deviations from exact parallelism, in particular of below 10°, advantageously of below 5°, particularly advantageously of below 1°.

In a comparison of parallel paths, in particular lying next to one another, a difference in distances covered by the robot vehicle traveling over the paths can be established particularly easily and directly, and the presence of obstacles can be concluded from this. Therefore, traveling over the processing area in preferably parallel paths with turns at their ends, in particular paths lying next to one another with 180° turns at their ends, represents the easiest and economically most appropriate way in which the autonomous mobile robot vehicle can travel over the processing area. On account of the rectilinear structure and the short displacement paths between two parallel paths, in particular lying next to one another, in the course of the turns, in particular 180° turns, this way of advancing the autonomous robot vehicle traveling over the processing area on a mapping trip allows particularly economical and time-saving mapping of the processing area. In addition, the autonomous mobile robot vehicle advantageously moves in particularly ordered paths, which reveal to an observer of the robot vehicle its intelligent control.

Suitable choice of the displacement between respectively parallel paths, in particular paths lying respectively next to one another, can achieve the effect that the robot vehicle maps the processing area without loss and/or without overlap. In particular the distance may be chosen as corresponding to the width of the robot vehicle, advantageously corresponding to the width with which, while traveling over a path, a further sensor for mapping the processing area maps the processing area on this path.

The direction in which the paths covered by the robot vehicle, in particular the parallel paths and/or paths lying next one another, substantially extend is referred to hereinafter as the preferential direction of travel.

In an advantageous embodiment of the method according to the disclosure for mapping a processing area, after ending of the initial mapping trip, a point on an identified boundary line is traveled to and the mapping of the unmapped subarea adjoining the boundary line is initiated from this point in the course of a further mapping trip of the robot vehicle into the adjoining unmapped subarea.

Advantageously, after ending of the initial mapping trip, a point on an identified boundary line is traveled to by means of a transfer trip. Mapping of the previously unmapped subarea is then initiated from the point located on the boundary line in the course of a further mapping trip. Preferably, the preferential direction of travel of the autonomous robot vehicle on its further mapping trip into the still to be mapped region may extend in the same direction as the preferential direction of travel on the initial mapping trip. Alternatively, the preferential direction of travel of the autonomous robot vehicle on its further mapping trip may also be in any other desired direction, for example in particular perpendicularly in relation to the preferential direction of travel of the initial mapping trip.

Particularly preferably, the autonomous robot vehicle may in the course of the mapping method detect already mapped subareas and in this way avoid repeated mapping of already mapped subareas. In particular, the detection of the already mapped subareas may be performed on the basis of the items of information already collected during the previous mapping trips, preferably on the basis of collected items of information on the position of already mapped subareas in relation to the processing area. This advantageously allows particularly cost-effective and quick mapping of the processing area.

Establishing the position of the point on the boundary line may be performed either on the basis of a fixed routine, for example by way of a fixed defined distance from the beginning or end of the boundary line. Alternatively, the position of the point may also be established by calculating the parameters characterizing the boundary line, for example in such a way that the point lies in the middle of the boundary line.

In an advantageous embodiment of the method according to the disclosure for mapping a processing area, when an obstacle on the first path of the further mapping trip that is at a distance less than a defined distance from the point from which the mapping of the unmapped subarea adjoining the boundary line was initiated is reached, a further point on the boundary line is traveled to.

It can be advantageously achieved in this way that, if entry of the autonomous robot vehicle into the previously unmapped, possibly mappable region may not be possible due to an obstacle, in particular a further obstacle, a further attempt at mapping the unmapped subarea adjoining the boundary line is initiated from a further point on the boundary line. Particularly advantageously, the traveling to a further point on the boundary line and initiating of a further mapping trip may be carried out iteratively, until either a possible entry of the autonomous robot vehicle into the unmapped adjoining subregion obviates the need for further attempts or no further point on the boundary line can be travel to any more. The autonomous robot vehicle can therefore advantageously carry out mapping of the unmapped subarea adjoining the boundary line even whenever the entry into the subarea to be mapped is at least partially hindered by an obstacle. If entry of the autonomous robot vehicle into the unmapped subarea adjoining the boundary line is not possible from any point on the boundary line, the subarea is identified as an obstacle. This strategy of the mapping method likewise appears to an observer of the autonomous robot vehicle as particularly intelligent.

In an advantageous embodiment of the method according to the disclosure for mapping a processing area, the further point is located at a defined distance from the first point on the boundary line, in particular a distance that corresponds substantially to the width of the robot vehicle, and the mapping of the unmapped subarea adjoining the boundary line is re-initiated from this further point in the course of the further mapping trip.

It is particularly advantageously achieved in this way that the number of points on the boundary line from which mapping of the unmapped subarea adjoining the boundary line can be initiated is limited. The choice of this distance preferably as corresponding to the width of the robot vehicle in this case represents an advantageous compromise of the minimum appropriate distance and maximum appropriate distance.

Alternatively, establishing the position of the further point and/or the further points may be performed either on the basis of a fixed routine—for example by way of a fixed distance from the first or previous further point—or be calculated from parameters characterizing the boundary line.

In an advantageous embodiment of the method according to the disclosure for mapping a processing area, a boundary line is allocated to the first path covered of the initial mapping trip over its entire distance.

In this way it is ensured that the subarea of the processing area to be mapped that is not traveled to during the first turn of the robot vehicle into the following, in particular parallel, path can be mapped after completion of the initial mapping trip in a further mapping trip. The allocation of this boundary line allows in particular mapping over the full surface area of the processing area to be mapped, independently of the preferential direction of travel in which and the location from which the autonomous robot vehicle begins the mapping of the processing area. This is particularly advantageous in particular whenever the autonomous robot vehicle on an initial mapping trip begins its journey on a path in a randomly chosen preferential direction of travel.

In an advantageous embodiment of the method according to the disclosure for mapping a processing area, each path covered of a mapping trip in which a defined path length has been reached is allocated a boundary line, which extends as an extension of the path in the direction of travel of the robot vehicle.

Depending on the type of design, a defined path length that limits a maximum distance to be covered by the robot vehicle on a traveled path to a corresponding length may be provided and set internally in the device, so that, after reaching the maximum distance to be covered, a turn of the robot vehicle is carried out even though no obstacle and/or delimitation of the processing area has been reached and/or detected. Such a limitation of the maximum path length to be covered may be necessary for example for reasons of the positional accuracy and/or the energy supply of the robot vehicle. According to the disclosure, each path covered during a mapping trip in which this defined path length is reached is allocated a boundary line that extends as an extension of the corresponding path. It can be advantageously achieved in this way that an unmapped subarea adjoining the path length, in particular an unmapped subarea adjoining as an extension of the corresponding path, is identified by means of a boundary line. Particularly advantageously, this identified unmapped subarea can be mapped after ending of the initial mapping trip in the course of a further mapping trip of the autonomous robot vehicle.

Typical maximum distances to be covered may depend in particular on a type of design of the autonomous robot vehicle. For example, in relation to autonomous lawnmowers, the position and/or odometry device of which is realized in the form of a traction control system, which ascertains from a revolution of drive wheels of the autonomous robot vehicle a distance covered and a heading angle covered, the maximum distance to be covered may be in particular more than 5 m, preferably more than 10 m, particularly preferably more than 15 m. In the case of an autonomous robot vehicle that moves on relatively level floors of an interior space, a positional determination can be carried out much more accurately, so that here likewise considerably longer maximum distances to be covered can be obtained, in particular more than 15 m, preferably more than 30 m, particularly preferably more than 50 m. Particularly advantageously, complete mapping of the processing area to be mapped, i.e. over the full surface area, can be realized even whenever the path length is limited to a maximum distance to be covered by the robot vehicle.

In an advantageous embodiment of the method according to the disclosure for mapping a processing area, the map of the processing area is created as an overall area of the subareas mapped by the robot vehicle.

The location-dependent items of information successively acquired in the course of the method are advantageously collected, in particular collected successively, in the form of a list, a table, a collage, a matrix, in particular a multidimensional matrix, preferably a map, particularly preferably a multidimensional and/or pseudo-multidimensional map, an outline, a floor plan, a land plan, a topographical map, a land survey or in a similar way that appears appropriate to a person skilled in the art. In this case, results of the mapping, in particular the location-dependent items of information in relation to the processing area, are compiled in the map, in particular digitally, preferably stored, particularly preferably as a basis and/or as part of a navigation method, and made available to the autonomous robot vehicle.

The map of the processing area is created either successively or after the mapping trips on the basis of the subareas mapped by the robot vehicle. Preferably, this map contains all of the collected items of information concerning the mapped subareas, both of the initial mapping trip and of every further mapping trip. Subareas that cannot/could not be mapped either in an initial mapping trip or in any further mapping trip of the autonomous robot vehicle are preferably identified in the map as an obstacle and/or unmappable subareas. The map created in this way, in which the processing area is preferably created as an overall area of the subareas mapped by the robot vehicle, advantageously has a theoretically complete coverage of the processing area, i.e. over the full surface area, comprising the mapped processing areas and obstacles as unmappable subareas.

In an advantageous embodiment of the method according to the disclosure for mapping a processing area, processing of the processing area takes place during the initial mapping trip and/or further mapping trips.

According to the disclosure, simultaneous processing and mapping of the processing area can consequently be advantageously carried out. The combination of the two working steps, mapping and processing of the processing area, allows particularly efficient and spontaneous processing of the processing area to be realized, processing that can be carried out in particular without prior teaching of the robot vehicle—and advantageously without the presence of any information concerning the processing area—from any desired starting point of the autonomous robot vehicle on the processing area.

For example, at the same time as mapping the processing area, this processing area may already be processed by sweeping, cleaning, vacuuming, wiping, mopping, mowing, sowing, fertilizing or the like by an autonomous sweeping, cleaning, vacuuming, floor-wiping, lawnmowing, sowing or fertilizing robot.

Advantageously, the map of the processing area produced in this way during the first processing of the processing area may be made available, particularly preferably stored, device-internally for further use of the information contained therein.

In an advantageous embodiment of the method according to the disclosure for mapping a mapping area, the map created in the course of the initial mapping trip and/or further mapping trips is used for the navigation of the robot vehicle during subsequent trips for the processing of the processing area.

Particularly advantageously, a map created in the course of the method for mapping the processing area may be stored by means of a storage medium in the autonomous robot vehicle or externally and made available device-internally or externally for further processing and/or use. For this purpose, it may be provided to store the map by means of a memory device in the autonomous robot vehicle. Advantageously, renewed and/or repeated mapping of the processing area is not necessary in the course of renewed processing of the processing area, since the autonomous robot vehicle can carry out navigation in the processing area by means of the stored map. Particularly advantageously, an improvement and/or optimization of the navigating method on which further processing of the processing area is based can be carried out by means of the stored map. In particular, a processing structure of the processing area to be processed that is improved with regard to traveling times and/or routes can be calculated in advance and used as a basis for further navigation of the robot vehicle in renewed processing of the processing area. Consequently, particularly quick, efficient and economical processing of the processing area can be realized on the basis of the map once created.

In an alternative or additional embodiment, the map created can also be transmitted by means of a data communication device to an external device, for example for the purpose of processing.

In an advantageous embodiment of the method according to the disclosure for mapping a processing area, the mapping method is carried out in every trip of the robot vehicle, in particular every trip for processing the processing area.

In one embodiment of the mapping method according to the disclosure, efficient and reliable processing of the processing area, in particular over virtually the full surface area, can be realized in every newly begun processing trip, which can in particular be carried out without prior teaching of the robot vehicle and advantageously without the presence of any information concerning the processing area.

In particular, according to the disclosure, carrying out the processing of the processing area is independent of the starting position of the autonomous robot vehicle at the beginning of the processing and also independent of the preferential direction of travel in which the processing of the processing area in paths, in particular parallel paths, is performed. Carrying out the method for mapping the processing area to be mapped in each trip of the robot vehicle, in particular each processing trip, is preferably appropriate whenever the accuracy of the ascertainment of the position of the autonomous robot vehicle with respect to the processing area does not allow reliable navigation of the robot vehicle on the processing area to be ensured continuously by using a map once produced. In particular, in this embodiment storage of the map created need not be provided.

In a further embodiment of the method according to the disclosure for mapping the processing area, repeated carrying out of the method in every trip can be used advantageously to confirm, supplement, correct, refine and/or refute items of information once collected, so that the map once created is updated in the course of further trips of the robot vehicle. This embodiment presupposes a sufficiently reliable and accurate ascertainment of the position of the autonomous robot vehicle with respect to the processing area.

Also proposed according to the disclosure is a mapping and/or navigation device for use in an autonomous robot vehicle for carrying out a method for mapping a processing area, in particular for determining a processing area, having at least a computing unit, a driving unit for moving the robot vehicle and a device for ascertaining position and/or odometry data, and characterized in that the computing unit identifies boundary lines between adjoining mapped and unmapped subareas of the processing area to be mapped by comparing distances covered by the robot vehicle traveling over the processing area on an initial mapping trip that are obtained by the device for ascertaining position and/or odometry data, the driving unit is provided for traveling to a point on an identified boundary line in order to carry out mapping of an unmapped subarea adjoining the boundary line in the course of a further mapping trip of the robot vehicle into the unmapped subarea and the computing unit creates a map of the processing area on the basis of the subareas mapped by the robot vehicle.

The computing unit is intended to be understood as meaning at least one device that has an information input for accepting items of information, an information processing unit for processing, in particular for calculating, items of information, and also an information output for passing on the processed and/or calculated items of information. Advantageously, the computing unit has components that comprise at least a processor, a memory and an operating program with evaluating and calculating routines. Advantageously, the electronic components of the computing unit may be arranged on a printed circuit board, preferably on a common printed circuit board with a control device of the mapping and/or navigation device for controlling the autonomous robot vehicle and particularly preferably in the form of a microcontroller. In particular, the control device and the computing unit may particularly preferably also be designed as a single component. The computing unit is provided for obtaining, processing, in particular evaluating, passing on and possibly also storing items of information concerning a position of the autonomous robot vehicle with respect to the processing area and also items of information relevant for the creation of a map from a sensor device. In particular, the computing unit is provided for carrying out a comparison of distances covered by the autonomous robot vehicle obtained by the device for ascertaining position and/or odometry data and, on the basis of this comparison, identifying boundary lines between adjoining mapped and unmapped subareas of the processing area. Furthermore, the computing unit is provided for creating a map of the processing area on the basis of the subareas mapped by the robot vehicle, in particular using items of information collected during the mapping.

According to the disclosure, the mapping and/or navigation device has at least one sensor device, by way of which detection of items of information relevant for the creation of a map, in particular items of information relevant for the navigation method, takes place. A sensor device is intended to be understood in this connection as meaning in particular a device that is provided for recording at least one characteristic variable and/or item of information and/or a physical property, it being possible for the recording to take place actively, such as in particular by generating, emitting and acquiring a measuring signal, and/or passively, such as in particular by acquisition of changes of properties of a sensor component. Various sensor devices that appear appropriate to a person skilled in the art are conceivable, and these may in particular comprise for example optical sensors, in particular photographic sensors, acoustic sensors, in particular ultrasound sensors, or else inclination, distance, translation, acceleration, rotation, contact, induction, capacitance, temperature, moisture, radiation, chemo sensitive sensors or the like. At least, the sensor device has sensors for detecting an obstacle and/or a delimitation of the processing area.

In addition, the mapping and/or navigation device has a device for ascertaining position and/or odometry data of the autonomous robot vehicle. This device serves for determining position and/or odometry data for the correlation of items of information relevant for the creation of the map with the position of the autonomous robot vehicle with respect to the processing area to be mapped.

The device for determining position and/or odometry data may have for this purpose in particular one or more sensors from a group of sensors comprising at least inclination, angle, distance, translation, acceleration and rate-of-rotation sensitive sensors. For example and preferably, the device for ascertaining position and/or odometry data can be realized by using driving means used for driving the robot vehicle. For example, in particular, rotations of rolling bodies, wheels, chains or the like that turn when the robot vehicle is moving in relation to the processing area can be evaluated for determining a change in position and/or a change in odometry. In particular, the device for ascertaining position and/or odometry data, possibly in combination with the computing unit, is designed for ascertaining a distance covered in the direction of travel by the robot vehicle moving on a path, preferably also a heading angle covered on the path. Alternatively or in addition, the device may also comprise further sensors for ascertaining position data. Positional determination may also be preferably realized by using GPS, echo, sonar, range, ultrasound or other sensors that appear appropriate to a person skilled in the art for ascertaining position and/or odometry data.

The driving unit of the mapping and/or navigation device of the autonomous robot vehicle serves for the advancement of the autonomous robot vehicle in relation to the processing area. In particular, the driving unit is designed to drive wheels, rollers, chains or other means of advancement that appear appropriate to a person skilled in the art provided for the advancement by means of open-loop and/or closed-loop control of typically motors, and consequently to make possible a movement of the robot vehicle, in particular a change of direction and travel. The driving unit is also provided for communicating with the navigation device and advantageously for obtaining from it a direction and a distance in which the movement of the robot vehicle has to be performed. In this way, in particular points and identified boundary lines can be traveled to directly, in order to carry out mapping of an unmapped subarea adjoining the respective boundary line in the course of a further mapping trip.

Also proposed according to the disclosure is an autonomous robot vehicle, which has at least one mapping and/or navigation device for carrying out a method for mapping a processing area, in particular for determining a processing area.

In particular, the autonomous robot vehicle may be realized as an autonomous sweeping machine, an autonomous cleaning robot, an autonomous snow clearing robot, an autonomous vacuum cleaner, an autonomous swimming pool cleaning machine, an autonomous floor wiping robot, an autonomous lawnmower, an autonomous seed drill, an autonomous fertilizing machine, an autonomous mapping machine or some other embodiment of an autonomous robot vehicle that appears appropriate to a person skilled in the art.

BRIEF DESCRIPTION OF THE DRAWINGS

The disclosure is explained in more detail in the following description on the basis of exemplary embodiments that are represented in the drawings. The drawings and the description contain numerous features in combination. A person skilled in the art will also expediently consider the features individually and put them together into appropriate further combinations. In the figures, the same reference numerals designate the same elements.

DETAILED DESCRIPTION

Figure 1:
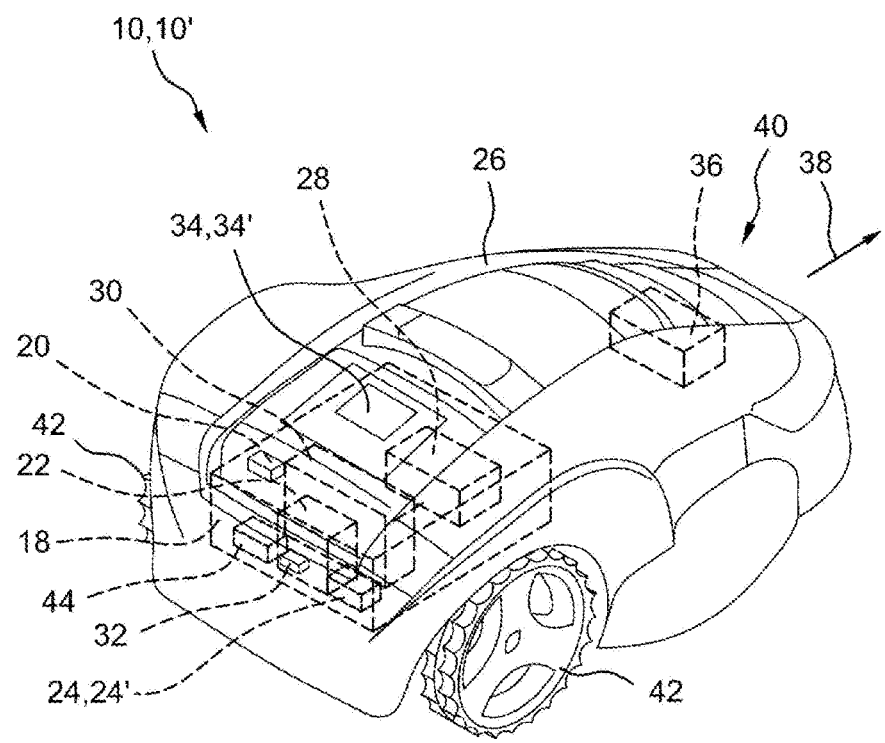
FIG. 1 shows an embodiment of an autonomous robot vehicle according to the disclosure in a perspective, schematic representation.

FIG. 1 shows an embodiment of an autonomous mobile robot vehicle 10, such as can be realized for example as an autonomous lawnmower 10', the processing area 12 of which that is to be processed consists of grassland or an area of lawn 12' of a garden (cf. FIG. 3), which has in particular a delimitation 14 of the processing area (for example garden border) and also obstacles 16 (for example objects on the grassland, beds or the like). The principles described hereinafter can also be transferred within the scope of other exemplary embodiments to other types of design of the robot vehicle 10, which can perform various other tasks, for example as vacuum cleaner robots, sweeping robots, cleaning robots, snow clearing robots, floor wiping robots, but in particular also merely as mapping robots without any further processing function. Depending on the task and the place of use of the robot vehicle 10, the processing region 12 may for example also consist of an interior or exterior space delimited by walls.

The autonomous robot vehicle 10, in FIG. 1 in the embodiment given by way of example of an autonomous lawnmower 10', has an open-loop and closed-loop control unit 18. The open-loop and closed-loop control unit 18 also has a memory unit 20, a computing unit 22 and also a data communication interface 24 for the data transmission. The open-loop and closed-loop control unit is arranged together with its components at least partially in a housing 26 of the autonomous lawnmower 10'. The data communication interface 24 of the open-loop and closed-loop control unit 18 is provided inter alia for transmitting a map of a processing area 12, here the grassland 12', produced on a mapping trip to the memory unit 20 and/or for reading out a stored map from the memory unit 20. The data communication interface 24 for the data transmission may be realized in particular in a wireless or cable-bound form. Alternatively, the data communication interface 24 may also be formed as a drive interface, and also have a further additional data communication interface 24' for the data transmission to external devices, for example tablets, smartphones, computers, further robot vehicles or the like.

The open-loop and closed-loop control unit 18 also has a controlling device 28. The controlling device 28 is provided for carrying out the mapping method according to the disclosure and also a navigating method of the autonomous lawnmower 10' and, in the course thereof, navigation of the autonomous lawnmower 10' by using the driving unit 30 for moving the robot vehicle 10. In particular, the controlling device 28 is provided for creating a map of the processing area 12 in the course of the mapping method and also in connection with the data communication interface 24 storing it, loading, reading out and interpreting a map stored on the memory unit 20.

Advantageously, the open-loop and closed-loop control unit 18 has a processor 32, which may also be part of the controlling device 28 or of the computing unit 22.

Furthermore, the open-loop and closed-loop control unit 18 has a user interface 34, by way of which items of information can be output to an operator or items of information can be input by an operator. In particular, the output unit 34 is formed by a touch display 34'.

The autonomous robot vehicle 10 in the form of the autonomous lawnmower 10' has a sensor unit 36, which is provided at least for detecting obstacles 16 and/or delimitations 14 of the processing area 12 (cf. FIG. 3). The sensor unit 36 is provided for outputting a signal to the open-loop and closed-loop control unit 18 in the event of detection of an obstacle 16 and/or a delimitation 14 of the processing area 12, the signal in turn being provided for using the corresponding position of the obstacle 16 and/or the delimitation 14 for creating the map of the processing area 12. The sensor unit 36 is preferably arranged within the housing 26 of the autonomous robot vehicle 10. In particular, the sensor unit 36 is arranged in a forward region 40 of the autonomous robot vehicle 10, as seen along the direction of travel 38 of the autonomous robot vehicle 10. For the detection both of the obstacles 16 and of the delimitation 14 of the processing area 12, the sensor unit 36 has specially formed sensors, in particular for example a touch-sensitive sensor and also a magnetic-field-sensitive sensor, which allows detection of a magnetic field that is generated by means of a wire 14' enclosing the processing area 12 and flowed through by current (cf. FIG. 3).

In an alternative embodiment of the robot vehicle 10 according to the disclosure, detection of the delimitations 14 of the processing area 12 may also be realized in some other way, for example by using further and/or alternative sensors which, depending on the environment in which the autonomous robot vehicle 10 is used, ensure a delimitation 14 of the processing area 12. In particular, for example in the case of an autonomous lawnmower 10', a sensor for lawn detection may be provided, carrying out detection of the lawn delimitation on the basis of capacitive, optical, photometric, inductive or other measurable effects that appear appropriate to a person skilled in the art. Furthermore, the sensor unit 36 may have further component parts, for example an optical sensor, a moisture sensor, a capacitive sensor, a further magnetic field sensor or any other desired sensor that appears appropriate to a person skilled in the art. These further component parts, in particular sensors, are preferably likewise located in the forward region 40 of the autonomous robot vehicle 10.

For advancement, the autonomous robot vehicle 10, in particular the autonomous lawnmower 10', has wheels 42, which serve for driving and changing the direction of the robot vehicle 10. The wheels 42 are coupled to a motor (not represented here) and can be controlled and moved by means of the driving unit 30 for moving the robot vehicle 10.

An energy supplying device (not represented here) of the autonomous robot vehicle 10 is provided for supplying the robot vehicle 10 with electrical energy for putting it into operation and operating it. This device is preferably an energy store that is independent of the power grid, in particular a rechargeable battery, a standard battery, a fuel cell, a capacitor, some other energy store that appears appropriate to a person skilled in the art or a combination/multiple of these. Particularly preferably, the energy supplying device for supplying energy can be supplied again with energy and charged from a power grid in and/or outside the autonomous robot vehicle 10.

The open-loop and closed-loop control unit 18 of the robot vehicle 10 also has a device for ascertaining position and/or odometry data 44, which preferably communicates directly with the driving unit 30 for moving the robot vehicle. By means of this device 44, conclusions about the distance covered by the robot vehicle 10 can be drawn from the movement, in particular as a result of measuring the rotation of the wheels 42. The device for ascertaining position and/or odometry data likewise detects angular changes between paths covered. These angles and distances covered can be used to ascertain coordinates of the autonomous robot vehicle 10 with respect to the processing area 12. These coordinates serve for the assignment of items of information concerning the processing area 12 to positions of the robot vehicle 10 in the map to be created.

The entirety of the components consisting of the computing unit 22, the driving unit 30 for moving the robot vehicle 10 and the device for ascertaining position and/or odometry data 44 may be combined in particular as the mapping and navigation device.

Figure 2:
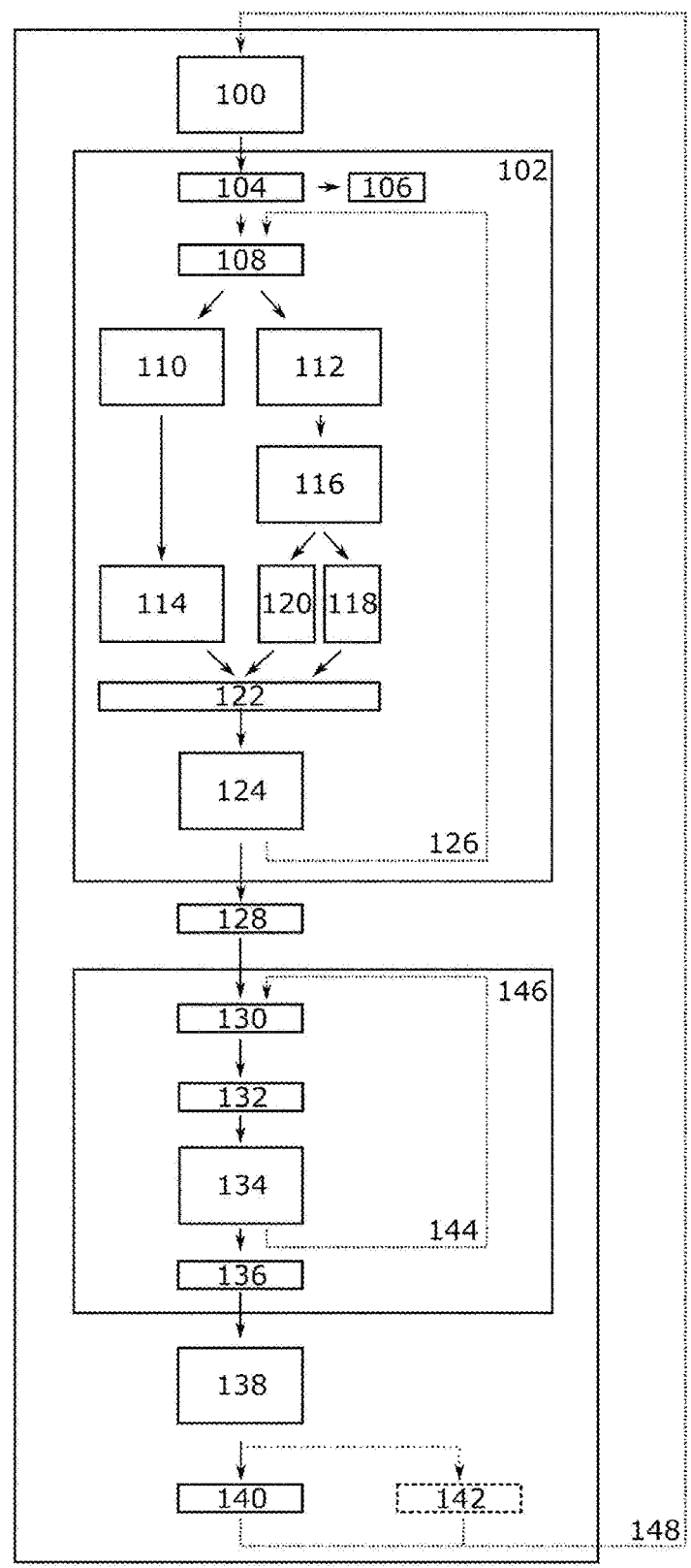
FIG. 2 shows a flow diagram of an embodiment of the method according to the disclosure for mapping a processing area.

FIG. 2 shows a flow diagram of an embodiment given by way of example of the method according to the disclosure for mapping a processing area 12, which is schematically explained in FIG. 3 on the basis of an exemplary embodiment. Beginning by leaving the base station or the starting location 46 of the autonomous robot vehicle 10 on a processing area 12, in method step 100 the autonomous robot vehicle 10, here in the example of the autonomous lawnmower 10' from FIG. 1, begins its initial mapping trip (method block 102) by means of traveling straight on a first path 50 in a preferential direction of travel 48 (cf. FIG. 3a) of a random direction. "Preferential direction of travel 48 of a random direction" means in particular that, although the preferential direction of travel 48, in which the autonomous robot vehicle 10 travels over paths 52 aligned in parallel, remains substantially constant during the initial mapping trip, the alignment of the preferential direction of travel 48 in relation to the processing area 12 is chosen randomly at the beginning of the initial mapping trip, and may in particular differ with every renewed initial mapping of the processing area 12. The traveling straight ahead of the robot vehicle 10 on the first path 50 (cf. FIG. 3b) is represented in method step 104. The path 50 covered first on the initial mapping trip is allocated a boundary line 56, which corresponds to the distance of the first path 50 covered. This takes place in method step 106. With the beginning of the initial mapping trip, changing of the position of the robot vehicle 10, in particular in the form of a change in the positional coordinates of the autonomous robot vehicle 10 in relation to the processing area 12, is measured by means of the device for ascertaining position and/or odometry data 44. In particular, position and/or odometry data are converted into coordinates, which are reproduced in a map, and consequently represent in the map the paths 52 covered by the autonomous robot vehicle 10 (method step 108). While traveling straight ahead, the autonomous robot vehicle 10 may either reach a maximum distance 62 to be covered (cf. FIG. 4) (method step 110) or an obstacle 16 or a delimitation 14 of the processing areas 12 may be detected by means of the sensor unit 36 (method step 112). In the first case, in method step 114 a boundary line 64 lying as an extension of the path 62 covered is defined in the unmapped region 60 adjoining the path (cf. FIG. 4, with arrow in the direction of travel of marked paths). In the second case, the computing unit 22 carries out a comparison of distances of paths 52a, 52b lying next to one another (cf. FIG. 3b) (method step 116). If there is no difference (method step 118), no boundary line 66 is identified. Otherwise, the computing unit 22 allocates a boundary line 66 to the part of the longer path 52d covered that extends in the comparison beyond the shorter path 52c (method step 120). In both cases, the items of positional information, in particular the parameters needed for determining the location of the boundary lines 66, are stored, and consequently the map to be created is updated (method step 122). In the first case, the items of positional information are parameters of the boundary line 64 that are formed by a positional coordinate of the starting value and also an angular indication, which defines the direction of the boundary line 64 in the unmapped region 60. In the second case, two coordinates, which define the starting point and the end point of the boundary lines 66, are used for this. Subsequently, the autonomous robot vehicle 10 carries out a 180° turn 68 combined with a lateral displacement, which corresponds to a robot width, and begins traveling straight ahead on the following path (method step 124). The method steps 108 to 124 are repeated when each new path is traveled over by the autonomous robot vehicle 10 on its initial mapping trip. This is represented in the flow diagram of FIG. 2 by method step 126. The robot vehicle 10 accordingly travels over the substantially parallel paths 52 of the processing area 12 to be mapped while comparing (method step 116) distances delivered by a device for ascertaining position and/or odometry data 44, and on the basis of this comparison (method step 116) of the distances identifies boundary lines 66 between adjoining mapped 58 and unmapped 60 subareas, until the autonomous robot vehicle 10 can no longer reach any further path by means of a 180° turn 68 (method step 124) (cf. FIG. 3b). At this point, the initial mapping trip is completed by completion of the last path 74 that can be traveled on the initial mapping trip (method step 128). With the end of the initial mapping trip, the method for mapping a processing area 12 goes over into a second phase.

In method step 130, a point 70 on an identified boundary line 66, 64, 56 (cf. FIG. 3c) is selected by the computing unit 22 and subsequently traveled to by using the stored and/or calculated coordinates by the driving unit 30 of the robot vehicle 10 in a transfer trip 72 (method step 132). In this exemplary embodiment, processing of the processing area 12 to be processed is suspended during the transfer trip 72, i.e. mowing during the transfer trip 72. When this point 70 on an identified boundary line 66, 64, 56 is reached, a further mapping trip of the autonomous robot vehicle 10 is started in the unmapped subarea 60 directly adjoining the boundary line 66, 64, 56. The then initiated mapping of the unmapped subarea 60 corresponds to mapping as described in the course of the initial mapping trip (method block 102) in method steps 104 to 126. A repetition of these method steps is combined in method step 134. Once the originally unmapped subarea 60 adjoining the boundary line 66, 64, has been mapped, the procedure is repeated, i.e. method step 130, selection of a point 70 on a boundary line 66, 64, 56, method step 132, transfer trip 72 of the autonomous robot vehicle 10 to this point 70, and also method step 134, mapping of the unmapped subarea 60 adjoining the boundary line 66, 64, 56 by means of a further mapping trip (combined in method step 144).

Once the last path 74 of the last further mapping trip has been ended (method step 136), the autonomous robot vehicle 10 returns to its base station or starting location 46 (method step 138). In the exemplary embodiment represented, processing of the area to be processed has already been carried out during the entire mapping and, after reaching the base station 46 (method step 138), the map created is erased (method step 140). The method according to the disclosure is then carried out once again (represented by method step 148), when the robot vehicle once again leaves the base station 46 for processing and/or mapping.

In an alternative embodiment of the method according to the disclosure, it is also possible that, after reaching the base station 46 (method step 138), the map created is stored and/or made available to the computing unit 22 for optimizing distances to be covered (alternative method step 142). In this way, particularly efficient and, in terms of time, particularly quick and/or short paths between transfer trips 72 between subareas to be processed can be determined in particular, and these can be used as a basis for further processing of the area. This is of advantage in particular whenever the map is stored as a basis for further processing trips of the autonomous robot vehicle 10 and is loaded by the open-loop and closed-loop control unit 18 and used in the course of the navigating method during the next trip for processing the processing area 12. Particularly advantageously, it is also conceivable that the map created is further supplemented and/or modified by repeatedly carrying out the method according to the disclosure (likewise indicated in method step 148) on further trips of the autonomous robot vehicle 10, in particular processing trips for processing the area 12.

FIG. 3 shows schematic plan views a-e of a processing area 12 to be processed, on which the autonomous robot vehicle 10, in particular the autonomous lawnmower 10', is located and advances, which can respectively be assigned to various points in time of the method given by way of example that is represented in FIG. 2.

Figure 3A:
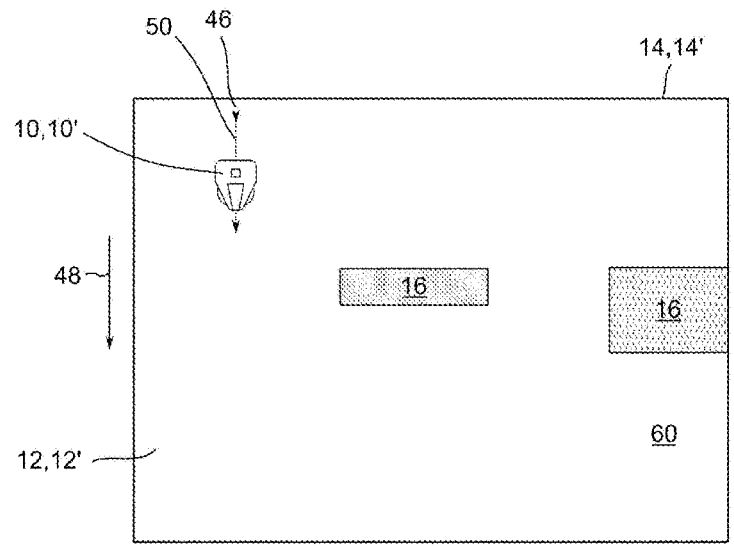
FIGS. 3a-e show a schematic representation of a system consisting of an autonomous robot vehicle and also a processing area to be mapped, having obstacles, at five different points in time in the course of carrying out an embodiment of the method according to the disclosure.

In FIG. 3a, the autonomous robot vehicle 10, in particular the autonomous lawnmower 10', is located in the forward direction on its first path 50 of the initial mapping trip (method block 102). On the area 12 to be processed, in particular grassland 12', there are two obstacles 16. The processing area 12 to be processed is spatially delimited in its extent by a delimitation 14, which is defined in particular by a delimiting wire 14'. In an alternative embodiment, this delimitation 14 may also be realized differently, for example by a transition from grass of the grassland 12' to some other material outside the processing area 12. Furthermore, the starting location 46, for example in the form of a base station, is also arranged in FIG. 3a. The forward direction of the robot vehicle identifies the preferential direction of travel 48. After reaching the end of the first path 50 of the initial mapping trip, the first path 50 is assigned a boundary line 56 over its entire length (method step 106). In this way it is ensured that the subarea 60 of the processing area 12 to be mapped that is not traveled to during the first turn 68 of the robot vehicle 10 into the following, in particular parallel, path can be mapped after completion of the initial mapping trip in a further mapping trip.

Figure 3B:
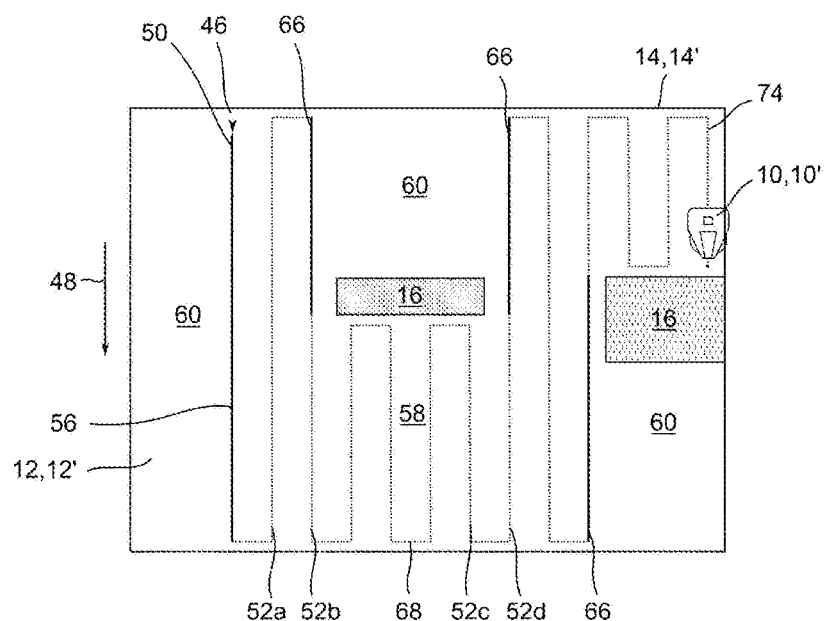

FIG. 3b shows the same plan view of the processing area 12 at a later point in time during the initial mapping method (method block 102). During this initial mapping trip (method block 102), the autonomous robot vehicle 10 covers straight and substantially parallel paths 52 with 180° turns 68 at their ends. The lengths of the distances covered by the robot vehicle 10 on the paths 52, in particular paths 52a, 52b lying next to one another, varies in dependence on the presence of obstacles 16 on the corresponding paths (e.g. 52c, 52d). Consequently, FIG. 3b reveals paths 52d of which the distance is limited by the delimitation 14 of the processing area 12, or paths 52c of which the distance is limited by the presence of an obstacle 16. The mapping method according to the disclosure provides that boundary lines 66 between adjoining mapped 58 and unmapped 60 subareas are identified by comparison of distances covered (method step 116) of paths 52a, 52b lying next to one another. These boundary lines 66 are in this case assigned to the section of the longer path 52d that extends beyond the shorter section 52c of the neighboring path. After traveling over the last path 74 of the initial mapping trip (method step 128), a contiguous mapped region 58 and also three individual unmapped subareas 60 result in the exemplary embodiment in FIG. 3b.

Figure 3C:
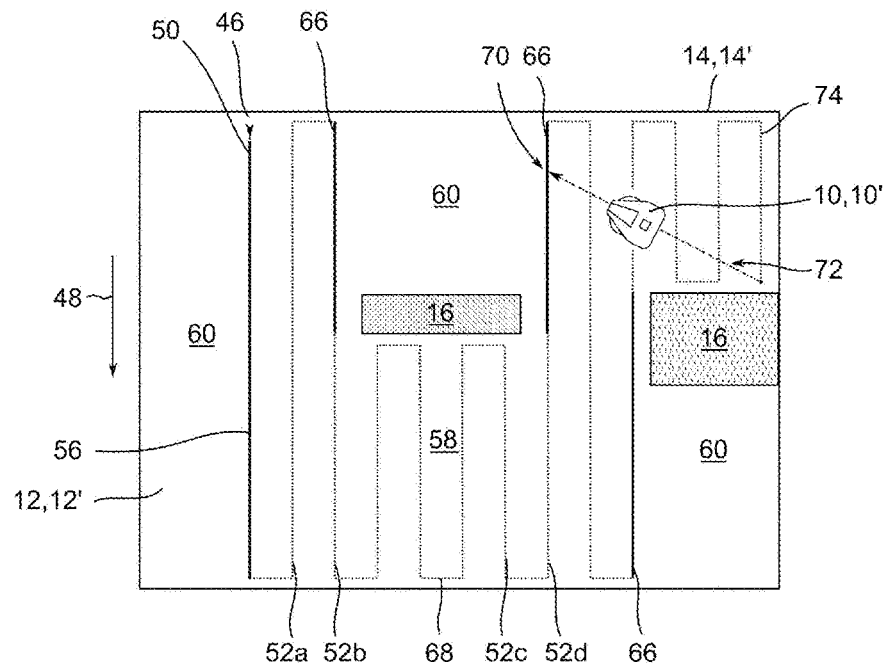
Figure 3D:
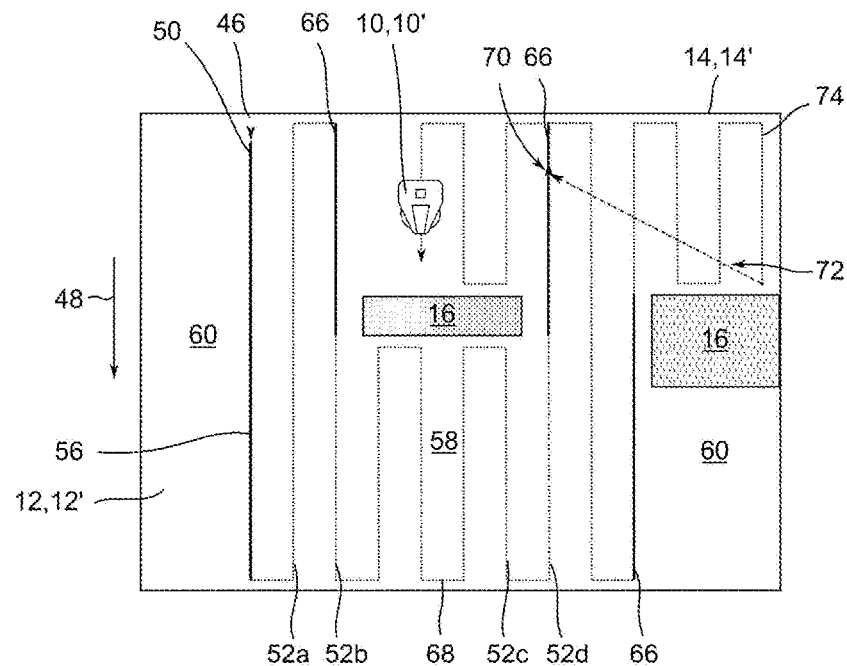
Figure 3E:
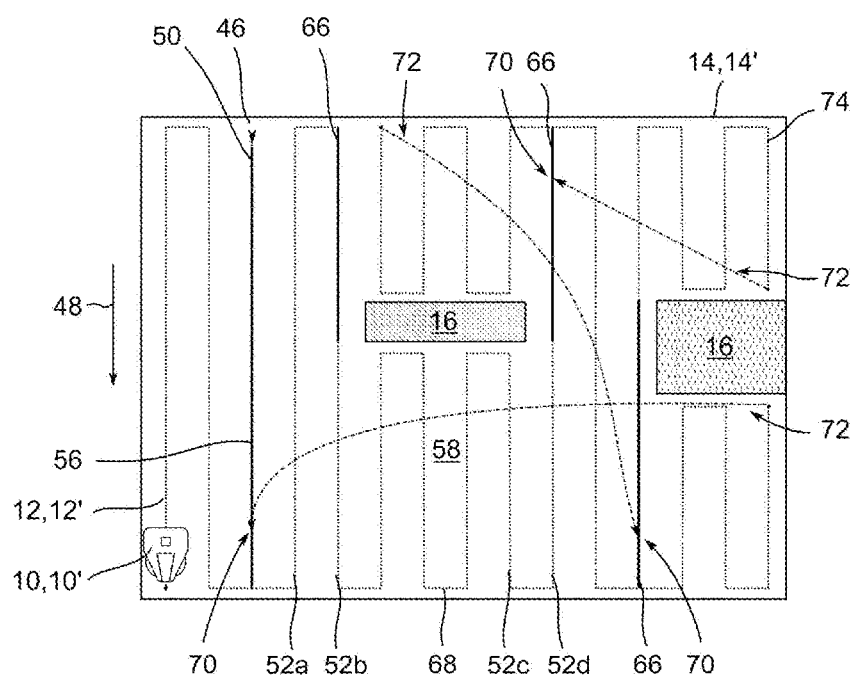
Figure 4:
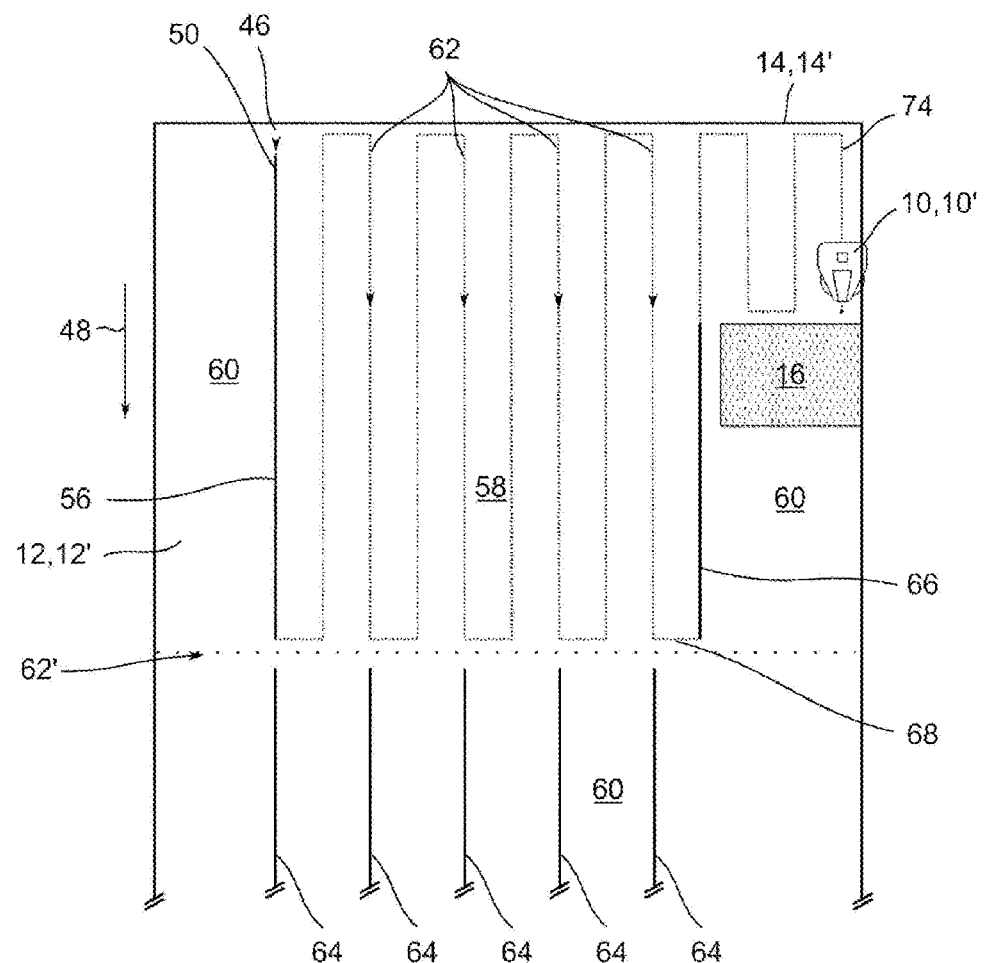
FIG. 4 shows a schematic representation of a system consisting of an autonomous robot vehicle and a processing area to be mapped, having an obstacle, and also boundary lines that have been identified on the basis of reaching a maximum distance to be covered by the robot vehicle on a path.

In a way corresponding to method step 132, schematically represented in FIG. 3c, the autonomous robot vehicle 10 moves by means of a transfer trip 72 from the end point of the initial mapping trip to a point 70 on one of the identified boundary lines 66 (equivalently also 64 and 56; cf. FIGS. 3e and 4). This point lies in particular about 2 m away from the end of the boundary line 66. Having arrived at this point 70, mapping of the unmapped subarea 60 adjoining the boundary line 66 (equivalently 56 and 64) is begun in a next method step 134.

The subsequent mapping of this previously unmapped subarea 60 is represented in FIG. 3d (method step 134). Once this region has also being mapped, the method steps of selecting the point 70 (method step 130), the transfer trip 72 (method step 132) and also the mapping of the unmapped region 60 (method step 134) are repeated for the two following, still unmapped subareas 60.

In FIG. 3e it is shown which paths 52 and transfer trips 72 the autonomous robot vehicle 10 has covered at the end both of the initial mapping trip (method block 102) and of the further mapping trips (method steps 130-136). This results altogether in three transfer trips 72 (plus the transfer trip of the robot vehicle 10 back into the base station 46, not represented here). The result is a processing area 12 mapped over the full surface area, from which the coordinates for the obstacles 16 and for the mapped processing areas 58 that are accessible for the autonomous robot vehicle 10 can be taken. In the exemplary embodiment represented, processing of the processing area 12 takes place while the mapping method is being carried out, so that at the end of the initial mapping trip and of the further mapping trips complete processing of the processing area 12 has taken place. As described, in this exemplary embodiment the map may be erased again, in particular not stored, after reaching the base station 46.

In an alternative embodiment of the method according to the disclosure, the map created may also be stored for further processing, in particular for optimization of navigation methods of the autonomous robot vehicle 10, and also be passed on to the computing unit 22 or the digital communication interface 24.

FIG. 4 shows a schematic plan view of the processing area 12 to be processed, on which the autonomous robot vehicle 10, in particular the autonomous lawnmower 10', is located and advances. In this example of a representation, the autonomous robot vehicle 10, in particular the autonomous lawnmower 10', has repeatedly reached the maximum distance to be covered (represented by the dashed lines 62') on multiple traveled paths 62. For example, this maximum distance to be covered may, to the advantage of more accurate positional determination, be limited to about 10 m. As a consequence of the 180° turns 68 initiated as a result, there remains an unmapped subarea 60, which is marked by means of boundary lines 64 as an extension of the paths 62 respectively covered. Particularly advantageously, this unmapped subarea 60 is mapped after ending of the initial mapping trip in the course of a further mapping trip (method step 146) of the autonomous robot vehicle.

The invention claimed is:

1. A method for mapping a processing area as part of a navigation of an autonomous robot vehicle, the method comprising:
    identifying boundary lines between adjoining mapped subareas and unmapped subareas of the processing area to be mapped by comparing distances covered by the robot vehicle traveling over the processing area during an initial mapping trip of the robot vehicle;

initiating a mapping of an unmapped subarea adjoining a first boundary line of the identified boundary lines from a first point on the first boundary line during a further mapping trip of the robot vehicle into the unmapped subarea, the robot vehicle following the first boundary line from the first point to an end point of the first boundary line and turning into the unmapped subarea from the end point of the first boundary line; and generating a map of the processing area based on the subareas mapped by the robot vehicle, wherein during the initial mapping trip, the robot vehicle traverses the processing area with a sequence of parallel paths lying next to each other with 180° turns at their ends until an end of the initial mapping trip is reached, the sequence of parallel paths being performed starting from a starting point and extending across the processing area in a first direction, each path in the sequence ends when further travel along the path is not possible at which point a 180° turn is perform ed, the end of the initial mapping trip occurring when further travel along a path is not possible and entry onto a next path is not possible.

2. The method as claimed in claim 1, wherein the initial mapping trip and the further mapping trip are connected by way of a transfer trip of the robot vehicle.

3. The method as claimed in claim 1, the identifying further comprising:
identifying a respective boundary line of the boundary lines between adjoining mapped subareas and unmapped subareas in response to a distance covered by the robot vehicle on a first path differing from a distance covered by the robot vehicle on a second path which lies next to the first path by at least one of a relative amount and an absolute amount.

4. The method as claimed in claim 1, further comprising:
assigning a boundary line of the identified boundary lines to a longer of two paths lying next to one another.

5. The method as claimed in claim 1, wherein a boundary line of the identified boundary lines represents a part of a longer path that extends beyond a compared distance of a shorter path.

6. The method as claimed in claim 1, wherein the robot vehicle travels over the processing area to be mapped during a mapping trip in a defined pattern.

7. The method as claimed in claim 1, wherein, when an obstacle on a first path of the further mapping trip that is at a distance less than a first defined distance from the first point on the first boundary line is reached such that entry of the robot vehicle into the unmapped subarea is prevented, a second point on the first boundary line is traveled to.

8. The method as claimed in claim 7, wherein the second point on the first boundary line is located at a second defined distance from the first point on the first boundary line, the method further comprising:
re-initiating the mapping of the unmapped subarea adjoining the first boundary line from the second point on the first boundary line during the further mapping trip.

9. The method as claimed in claim 1, wherein a boundary line of the identified boundary lines is allocated to a first path covered during the initial mapping trip over an entire distance of the first path.

10. The method as claimed in claim 1, further comprising:
allocating a boundary line of the identified boundary lines to each path covered during a mapping trip in which a defined path length has been reached, which extends as an extension of the respective path in a direction of travel of the robot vehicle.

11. The method as claimed in claim 1, the generating of the map further comprising:
generating the map of the processing area at least as an overall area of the subareas mapped by the robot vehicle.

12. The method as claimed in claim 1, further comprising:
processing the processing area during at least one of the initial mapping trip and further mapping trips.

13. The method as claimed in claim 1, further comprising:
using the map created during at least one of the initial mapping trip and further mapping trips for the navigation of the robot vehicle during subsequent trips for the processing of the processing area.

14. The method as claimed in claim 1, further comprising:
carrying out the steps of identifying, initiating, and generating during every trip of the robot vehicle for processing the processing area.

15. The method as claimed in claim 5, wherein the boundary line of the identified boundary lines represents a part of a longer parallel path that extends beyond a compared distance of a shorter parallel path.

16. The method as claimed in claim 8, wherein the second defined distance from the first point on the first boundary line to the second point on the first boundary line corresponds substantially to a width of the robot vehicle.

17. The method of claim 1, wherein the first point on the first boundary line is about 2 meters from the end point.

18. A mapping and navigation device of an autonomous robot vehicle for mapping a processing area, the mapping and navigation device comprising:
a computing unit;
a driving unit configured to move the robot vehicle; and
a device configured to ascertain at least one of position data and odometry data,
wherein the driving unit is configured to cause the robot vehicle to perform an initial mapping trip during which the robot vehicle traverses the processing area with a sequence of parallel paths lying next to each other with 180° turns at their ends until an end of the initial mapping trip is reached, the sequence of parallel paths being performed starting from a starting point and extending across the processing area in a first direction, each path in the sequence ends when further travel along the path is not possible at which point a 180° turn is performed, the end of the initial mapping trip occurring when further travel along a path is not possible and entry onto a next path is not possible,
wherein the computing unit is configured to identify boundary lines between adjoining mapped subareas and unmapped subareas of the processing area to be mapped by comparing distances covered by the robot vehicle traveling over the processing area during the initial mapping trip of the robot vehicle, the computing unit being configured to obtain the distances from the device configured to ascertain the at least one of the position data and the odometry data,
wherein the driving unit is configured to cause the robot vehicle to perform a further mapping trip after the initial mapping trip during which the robot vehicle travels to a first point on a first boundary line of the identified boundary lines and follows the first boundary line from the first point to an end point of the first boundary line and then turns into the unmapped subarea from the end point of the first boundary line in order to map the unmapped subarea adjoining the first boundary line, and wherein the computing unit is configured to generate a map of the processing area on the basis of the subareas mapped by the robot vehicle.

19. An autonomous robot vehicle comprising:
at least one mapping and navigation device, the at least one mapping and navigation device comprising:
  a computing unit;
  a driving unit configured to move the robot vehicle; and
  a device configured to ascertain at least one of position data and odometry data,
  wherein the driving unit is configured to cause the robot vehicle to perform an initial mapping trip during which the robot vehicle traverses the processing area with a sequence of parallel paths lying next to each other with 180° turns at their ends until an end of the initial mapping trip is reached, the sequence of parallel paths being performed starting from a starting point and extending across the processing area in a first direction, each path in the sequence ends when further travel along the path is not possible at which point a 180° turn is performed, the end of the initial mapping trip occurring when further travel along a path is not possible and entry onto a next path is not possible,
  wherein the computing unit is configured to identify boundary lines between adjoining mapped subareas and unmapped subareas of the processing area to be mapped by comparing distances covered by the robot vehicle traveling over the processing area during the initial mapping trip of the robot vehicle, the computing unit being configured to obtain the distances from the device configured to ascertain the at least one of the position data and the odometry data,
  wherein the driving unit is configured to cause the robot vehicle to perform a further mapping trip after the initial mapping trip during which the robot vehicle travels to a first point on a first boundary line of the identified boundary lines and follows the first boundary line from the first point to an end point of the first boundary line and then turns into the unmapped subarea from the end point of the first boundary line in order to map the unmapped subarea adjoining the first boundary line, and
  wherein the computing unit is configured to generate a map of the processing area on the basis of the subareas mapped by the robot vehicle.

* * * * *